United States Patent
Hull

[11] Patent Number: 5,808,965
[45] Date of Patent: Sep. 15, 1998

[54] LABORATORY TEST METHOD TO MEASURE TOWED ARRAY HYDROPHONE RESPONSE

[75] Inventor: Andrew J. Hull, Middletown, R.I.

[73] Assignee: The United States of America as represented by the Secretary of the Navy, Washington, D.C.

[21] Appl. No.: 863,616

[22] Filed: May 23, 1997

[51] Int. Cl.⁶ ............................... H04B 17/00
[52] U.S. Cl. ............................... 367/13; 73/1.83
[58] Field of Search ................. 367/13; 73/1.83

[56] References Cited

U.S. PATENT DOCUMENTS

| | | | |
|---|---|---|---|
| 4,205,394 | 5/1980 | Pickens | 367/13 |
| 5,046,055 | 9/1991 | Ruffa | 367/154 |
| 5,210,718 | 5/1993 | Bjelland et al. | 367/13 |

*Primary Examiner*—Ian J. Lobo
*Attorney, Agent, or Firm*—Michael J. McGowan; James M. Kasischke; Prithvi C. Lall

[57] ABSTRACT

A method for determining whether a hydrophone being tested is being properly responding to a pressure field is described. The method comprises the steps of providing a shell filled with a liquid and having impedance heads attached to a first end and a second end of the shell and a number of pressure sensors or hydrophones positioned between the first and second ends within the liquid filled shell; developing a model of the pressure field within the liquid-filled shell; and comparing the response of at least one of the pressure sensors to the pressure field described by the model. The model of developing the step involves modeling the extensional wave contribution and the breathing wave contribution in the pressure field.

9 Claims, 3 Drawing Sheets

LABORATORY TEST METHOD TO MEASURE TOWED ARRAY HYDROPHONE RESPONSE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for determining whether a pressure sensor such as a hydrophone being tested is properly responding to a pressure field.

(2) Description of the Prior Art

Towed arrays containing hydrophone sensors for acquiring acoustic signals are known in the art. Prior to deployment it is desirable to test the hydrophones in the arrays to determine whether or not they are functioning properly. Typically, the hydrophones in the towed arrays are tested by pulling them underwater behind a ship. These at-sea field tests are quite expensive. Thus, there is a need for a less expensive approach for testing the hydrophones to be used in a towed array.

SUMMARY OF THE INVENTION

Accordingly, it is an object of the present invention to provide a method for testing pressure sensors or hydrophones which can be performed in a laboratory environment.

It is a further object of the present invention to provide a method as above which is inexpensive as compared to at-sea tests.

The foregoing objects are attained by the method of the present invention.

In accordance with the present invention, a method for determining whether a pressure sensor or hydrophone being tested is properly responding to a pressure field broadly comprises the following steps. A shell filled with a liquid is provided, and impedance heads are attached to first and second ends of the shell. A number of pressure sensors or hydrophones are positioned between the first and second ends within the liquid filled shell. A model of the pressure field within the liquid-filled shell is developed. The response of at least one of the pressure sensors is compared to the pressure field described by the model. The model developing step of the present invention includes deriving a model of the pressure field within the liquid shell by modeling an extensional wave contribution and a breathing wave contribution.

The details of the method of the present invention, as well as other objects and advantages, are set forth in the following detailed description and accompanying drawings wherein like reference numerals depict like elements.

DETAILED DESCRIPTION OF THE PREFERRED EMBODIMENT(S)

Figure 1:
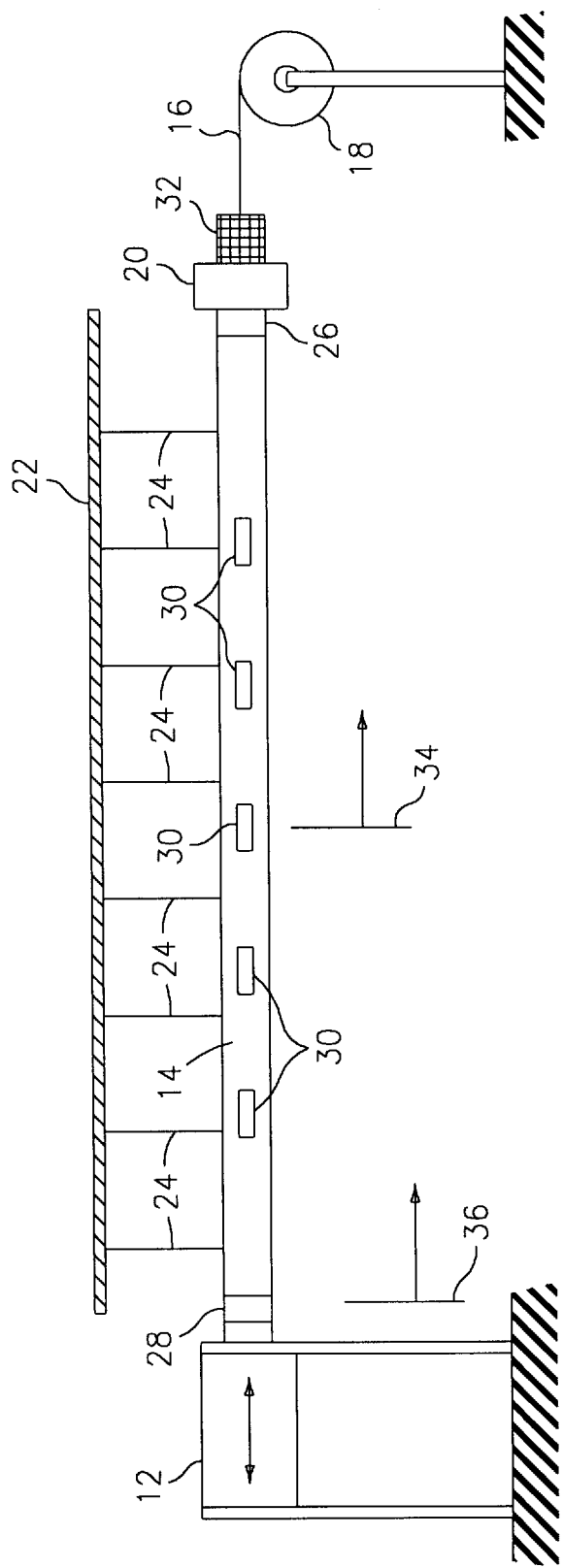
FIG. 1 is a schematic representation of a test system which may be used in the method of the present invention.

Referring now to the present invention, a model of the pressure field in a liquid-filled, cylindrical shell is developed using experimental pressure measurements of the pressure field. The underlying assumption is that two waves, an extensional and a breathing wave, are propagating in both axial directions of the shell. A four-term model that describes this motion is derived, and the six unknown model constants are determined with two inverse methods. The model makes no assumptions about the boundary conditions of the shell and the material properties of the shell or liquid. Concerning the shell and liquid interaction, the only assumption is that the dynamics of this process creates a breathing wave in the structure that originates at the bulkheads. This empirical model is developed as a measurement technique to determine if test hydrophones located within the shell are properly responding to the pressure field that they are sensing.

The pressure field inside the liquid-filled shell is derived from two wave equations in the spatial domain, both of which use pressure as the independent variable. The first equation models, the extensional wave contribution and is written as $$\frac{d^2 P_e(x,\omega)}{dx^2} + k_e^2 P_e(x,\omega) = 0, \quad (1)$$

where $P_e(x,\omega)$ is the temporal Fourier transform of the pressure that is generated by the extensional wave, x is the spatial location (m), $\omega$ is the excitation frequency (rad/s), and $k_e$ is the complex extensional wavenumber, which is equal to $$k_e = \frac{\omega}{c_e}, \quad (2)$$

where $C_e$ is the complex extensional wave speed (m/s). The second wave equation models the breathing wave contribution and is written as $$\frac{d^2 P_b(x,\omega)}{dx^2} + K_b^2 P_b(x,\omega) = 0, \quad (3)$$

where $P_b(x,\omega)$ is the temporal Fourier transform of the pressure that is generated by the breathing wave and $k_b$ is the complex breathing wavenumber (rad/m), which is equal to $$k_b = \frac{\omega}{c_b}, \quad (4)$$

where $c_b$ is the complex breathing wave speed (m/s). The solutions to equations (1) and (3) are complex exponential functions, and they can be added together using the principle of superposition, which yields the total pressure in the shell as $$P(x,\omega) = P_b(x,\omega) + P_e(x,\omega) = \overline{A}(\omega)e^{ik_b x} + \overline{B}(\omega)e^{-ik_b x} + \overline{C}(\omega)e^{ik_e x} + \overline{D}(\omega)e^{-ik_e x}, \quad (5)$$

where $P(x,\omega)$ is the temporal Fourier transform of the pressure that is generated by both the extensional and breathing waves; i is the square root of −1; and $\overline{A}(\omega)$, $\overline{B}(\omega)$, $\overline{C}(\omega)$, and $\overline{D}(\omega)$ are wave propagation coefficients determined by the boundary conditions. It is now noted that the pressure field at x divided by the forward accelerometer is $$\frac{P(x,\omega)}{\ddot{U}} = A(\omega)e^{ik_bx} + B(\omega)e^{-ik_bx} + C(\omega)e^{ik_ex} + D(\omega)e^{-ik_ex}, \quad (6)$$

where $\ddot{U}$ is the temporal Fourier transform of the acceleration at the forward end of the shell; $A(\omega)$, $B(\omega)$, $C(\omega)$, and $D(\omega)$ are wave propagation coefficients; and $P(x,\omega)/\ddot{U}$ has units of $Pa/(m/s^2)$. Physically, the coefficient $A(\omega)$ corresponds to forward-traveling breathing wave energy, $B(\omega)$ corresponds to aft-traveling breathing wave energy, $C(\omega)$ corresponds to forward-traveling extensional wave energy, and $D(\omega)$ corresponds to aft-traveling extensional wave energy.

There are six unknowns in equation (6), which are the four wave propagation coefficients and the two forced (breathing and extensional) wavenumbers. Using a laboratory configuration such, as that shown in FIG. 1 in which a longitudinal shaker 12 is placed at the forward end of a shell 14 allows all these unknowns to be estimated. Due to the nonlinear (and sinusoidal) nature of the parameters in equation (6), the most numerically stable method is to first estimate the extensional wavenumber, then the breathing wavenumber, and finally the wave propagation coefficients. A method to estimate the extensional and breathing wavenumbers has previously been developed. See A. J. Hull, "A Technique to Measure the Breathing Wave Speed in a Towed Array," *Journal of Vibration and Acoustics*, April 1994, Vol. 116, No. 2, pp. 243–245; A. J. Hull, "An Inverse Method to Measure the Axial Modulus of Composite Materials Under Tension," *Journal of Sound and Vibration*, August 1996, Volume 195, No. 4, pp. 545–551; and A. J. Hull, "An Inverse Method to Measure the Breathing Wave Speed in a Liquid-Filled Cylindrical Shell," NUWC Technical Report 11093, February 1996, Naval Undersea Warfare Center, New London, Conn., which are hereby incorporated by reference herein. A shortened version is included hereinbelow.

In order to estimate the wave propagation coefficients and the breathing wavenumber (and the corresponding breathing wave speed), it is necessary to know the extensional wavenumber (which is related to the corresponding extensional wave speed by equation (2)). This complex, frequency-dependent quantity is determined using measurements from forward and aft impedance heads that are attached to the shell ends in the test facility. Although these measurements contain a breathing wave contribution, it typically occurs only at low frequencies and can be easily discerned from the extensional wave effects.

The governing differential equation of the extensional wave is expressed on the spatial domain as a single wave equation with particle displacement as the independent variable:

$$\frac{d^2U(x,\omega)}{dx^2} + k_e^2 U(x,\omega) = 0, \quad (7)$$

where $U(x,\omega)$ is the temporal Fourier transform of the axial displacement. Equation (7) is a one-dimensional "lumped" approximation of the extensional wave motion in the system that combines the effect of the shell and the liquid together as a homogeneous medium that supports longitudinal wave motion. Although this approximation is not sufficient to model the radial motion of the shell, it is an accurate model of axial motion and the corresponding extensional wave propagation in the liquid-filled shell. The energy attenuation in the shell is defined with a structural damping law, and therefore the wave speed is a complex quantity. The real part of the wave speed corresponds to energy transmission and the imaginary part corresponds to energy attenuation. The solution to equation (7) is $$U(x,\omega) = G(\omega)e^{ik_ex} + H(\omega)e^{-ik_ex}, \quad (8)$$

where $G(\omega)$ and $H(\omega)$ are coefficients determined by the boundary conditions at the ends of the shell. The temporal Fourier transform of the axial force in the shell is $$F(x,\omega) = A_sE_x\frac{dU(x,\omega)}{dx} = A_sE_xik_e[G(\omega)e^{ik_ex} - H(\omega)e^{-ik_ex}], \quad (9)$$

where $A_s$ is the cross-sectional area of the shell ($m^2$) and $E_x$ is the effective longitudinal modulus of the shell ($N/m^2$). The known parameters in equations (8) and (9) are the location of the sensors (x) and the frequency of excitation ($\omega$). Although the effective longitudinal modulus ($E_x$) is unknown, equation (9) will be rewritten as a ratio of forces permitting the cancellation of this term and the cross-sectional area ($A_s$). Additionally, the coefficients $G(\omega)$ and $H(\omega)$ are unknown; however, they will be condensed out of the mathematical relationships. The inversion of equations (8) and (9) at the sensor locations will allow for a measurement of the unknown extensional wavenumber $k_e$ and extensional wave speed $c_e$. This technique is described next.

In the extensional wave measurement part of the experiment, the forward and aft pair of sensors (impedance heads) described earlier collected data that are in the form of transfer functions between each pair. The position of the forward pair of sensors is defined as x=0 and of the aft pair as x=L, where L is the length of a shell 14. See the origin line 36 in FIG. 1. The two transfer function measurements used are the forward displacement divided by the aft displacement and the forward force divided by the aft force. Their theoretical form can be rewritten using equations (8) and (9) as $$\frac{U(0,\omega)}{U(L,\omega)} = \frac{G(\omega) + H(\omega)}{G(\omega)e^{ik_eL} + H(\omega)e^{-ik_eL}} = R_1 \quad (10)$$

and $$\frac{F(0,\omega)}{F(L,\omega)} = \frac{G(\omega) - H(\omega)}{G(\omega)e^{ik_eL} - H(\omega)e^{-ik_eL}} = R_2, \quad (11)$$

where $R_1$ and $R_2$ are transfer function data from the experiment at a specific test frequency. Equations (10) and (11) are rewritten as functions of $H(\omega)/G(\omega)$ and are set equal to each other, yielding $$\cos(k_eL) = \frac{R_2R_1 + 1}{R_2 + R_2} = \phi, \quad (12)$$

where $\phi$ is a complex quantity. Using an angle-sum relationship on the complex cosine term in equation (12) and separating the equation into real and imaginary parts results in $$\cosh[Im(k_e)L] = \frac{Re(\phi)}{\cos[Re(k_e)L]} \quad (13)$$

and $$\sinh[Im(k_e)L] = \frac{-Im(\phi)}{\sin[Re(k_e)L]}, \quad (14)$$

where Re denotes the real part and Im denotes the imaginary part of the corresponding complex quantity.

Equation (14) is now squared and subtracted from the square of equation (13), yielding $$\{\cosh [Im(k_e)L]\}^2 - \{\sinh[Im(k_e)L)]\}^2 = \tag{15}$$

$$\frac{[Re(\phi)]^2}{\{\cos[Re(k_e)L]\}^2} - \frac{[Im(\phi)]^2}{\{\sin[Re(k_e)L]\}^2} = 1.$$

Equation (15) can be simplified with trigonometric power relationships to $$\cos[2Re(k_e)L] = [Re(\phi)]^2 + [Im(\phi)]^2 - \tag{16}$$

$$\sqrt{([Re(\phi)]^2 + [Im(\phi)]^2)^2 - (2[Re(\phi)]^2 - 2[Im(\phi)]^2 - 1)} = s.$$

Note that only a negative sign in front of the radical is used. The real part of $k_e$ in equation (16) is now solved for by $$Re(k_b) = \begin{cases} \frac{1}{2L} \text{Arccos}(s) + \frac{n\pi}{2L}, & n \text{ even} \\ \frac{1}{2L} \text{Arccos}(-s) + \frac{n\pi}{2L}, & n \text{ odd} \end{cases} \tag{17}$$

where n is a nonnegative integer and capital A denotes the principal value of the inverse cosine function. The value of n is determined from the function s, which is a cosine function with respect to frequency. At zero frequency, n is 0. Every time s cycles through $\pi$ radians, n is increased by 1. The imaginary part of $k_e$, is determined by adding equations (13) and (14) together, resulting in $$Im(k_e) = \frac{1}{L} \log_e \left\{ \frac{Re(\phi)}{\cos[Re(k_e)L]} - \frac{Im(\phi)}{\sin[Re(k_e)L]} \right\}. \tag{18}$$

Now that the real and imaginary parts of the wavenumber $k_e$ are known, the complex-valued extensional wave speed can be determined at each frequency by $$c_e = Re(c_e) + iIm(c_e) = \frac{\omega}{k_e}. \tag{19}$$

Note that the extensional wave speed has been measured without knowing the boundary conditions at x=0 and x=L.

Once the extensional wave speed is known, five independent equally spaced measurements of the spatial pressure field are needed to eliminate the wave propagation coefficients and solve for the breathing wave speed. Without loss of generality, the origin of the coordinate system is defined as x=0 at the middle (third) pressure sensor (hydrophone). See line 34 in FIG. 1. Equation (6) is written to correspond to the locations of the five pressure sensors as $$\frac{P(-2\delta,\omega)}{U} = A(\omega)e^{-ik_e 2\delta} + B(\omega)e^{ik_e 2\delta} + \tag{20}$$

$$C(\omega)e^{-ik_b 2\delta} + D(\omega)e^{ik_b 2\delta} = S_1,$$

$$\frac{P(-\delta,\omega)}{U} = A(\omega)e^{-ik_e \delta} + B(\omega)e^{ik_e \delta} + \tag{21}$$

$$C(\omega)e^{-ik_b \delta} + D(\omega)e^{ik_b \delta} = S_2,$$

$$\frac{P(0,\omega)}{U} = A(\omega) + B(\omega) + C(\omega) + D(\omega) = S_3, \tag{22}$$

$$\frac{P(\delta,\omega)}{U} = A(\omega)e^{ik_e \delta} + B(\omega)e^{-ik_e \delta} + \tag{23}$$

$$C(\omega)e^{ik_b \delta} + D(\omega)e^{-ik_b \delta} = S_4,$$

and $$\frac{P(2\delta,\omega)}{U} = A(\omega)e^{ik_e 2\delta} + B(\omega)e^{-ik_e 2\delta} + \tag{24}$$

$$C(\omega)e^{ik_b 2\delta} + D(\omega)e^{-ik_b 2\delta} = S_5,$$

where $\delta$ is the sensor-to-sensor spacing (m) and $S_1$ through $S_5$ correspond to the measured transfer function data of the hydrophone divided by the forward accelerometer at a specific frequency.

Equations (21) and (23) are now added together to yield $$(A+B)\cos(k_e\delta)+(C+D)\cos(k_b\delta)=(\tfrac{1}{2})(S_2+S_4) \tag{25}$$

and equations (20) and (24) are added together to produce $$(A+B)\cos(k_e 2\delta)+(C+D)\cos(k_b 2\delta)=(\tfrac{1}{2})(S_1+S_5) \tag{26}$$

Equation (22) is then rewritten with the term (A+B) on the left-hand side and is substituted into equations (25) and (26), yielding $$C + D = \frac{(1/2)(S_2 + S_4) - S_3\cos(k_e\delta)}{\cos(k_b\delta) - \cos(k_e\delta)} \tag{27}$$

and $$C + D = \frac{(1/2)(S_1 + S_3) - S_3\cos(k_e 2\delta)}{\cos(k_b 2\delta) - \cos(k_e 2\delta)}, \tag{28}$$

respectively. Equations (27) and (28) are next set equal to each other. Applying a double angle trigonometric relationship to the $\cos(k_b 2\delta)$ term then produces $$X \cos^2(k_b\delta) + Y \cos(k_b\delta) + Z = 0, \tag{29a}$$

where $$X = (S_2+S_4) - 2S_3\cos(k_e\delta), \tag{29b}$$

$$Y = S_3\cos(k_e\delta) - (\tfrac{1}{2})(S_1+S_5), \tag{29c}$$

and $$Z = [(\tfrac{1}{2})(S_1+S_5)+S_3]\cos(k_e\delta) - (\tfrac{1}{2})(S_2+S_4)\cos(k_e 2\delta) - (\tfrac{1}{2})(S_2+S_4) \tag{29d}$$

Equation (29) is a quadratic form with the solution $$\cos(k_b\delta) = \frac{-Y \pm \sqrt{Y^2 - 4XZ}}{2X} = \psi, \tag{30}$$

where $\psi$ is a complex quantity. Rewriting equation (30) as real and imaginary terms produces $$\cos(2Re(k_b)\delta) = [Re(\psi)]^2 + [Im(\psi)]^2 - \tag{31}$$

$$\sqrt{([Re(\psi)]^2 + [Im(\psi)]^2)^2 - (2[Re(\psi)]^2 - 2[Im(\psi)]^2 - 1)} = r,$$

where Re denotes the real part and Im denotes the imaginary part of the corresponding complex quantity. Note that only a negative sign in front of the radical is used in equation (31). However, both the negative and the positive signs in front of the radical in equation (30) are needed. The real part of $k_b$ in equation (31) is now solved for by $$Re(k_b) = \begin{cases} \frac{1}{2\delta} \text{Arccos}(r) + \frac{m\pi}{2\delta}, & m \text{ even} \\ \frac{1}{2\delta} \text{Arccos}(-r) + \frac{m\pi}{2\delta}, & m \text{ odd} \end{cases} \tag{32}$$

where m is a nonnegative integer and capital A denotes the principal value of the inverse cosine function. The value of m is determined from the function r, which is a cosine function with respect to frequency. At zero frequency, m is 0. Every time r cycles through $\pi$ radians, m is increased by 1. The imaginary part of $k_b$ is determined from equation (30), resulting in $$Im(k_b) = \frac{1}{\delta} \log_e \left\{ \frac{Re(\psi)}{\cos[Re(k_b)\delta]} - \frac{Im(\psi)}{\sin[Re(k_b)\delta]} \right\}. \tag{33}$$

Now that the real and imaginary parts of the wavenumber $k_b$ are known, the complex-valued breathing wave speed can be determined at each frequency with $$c_b = Re(c_b) + iIm(c_b) = \frac{\omega}{k_b}. \tag{34}$$

Use of this method produces two wave speed measurements because of the retention of the positive and negative signs in equation (30). One of the wave speeds is the breathing wave speed, and the other is the extensional wave speed, which was previously known. The extensional wave speed is typically at least one order of magnitude greater than the breathing wave speed.

Two mathematical methods are now used to estimate the wave propagation coefficients. The first, which uses four hydrophone measurements and (mathematically) produces an exact solution for the coefficients, is called the direct inverse method. The second uses N hydrophone measurements and a Gauss linearization scheme with an ordinary least squares constraint to solve for the coefficients.

In the first method, equation (6) is rewritten at four different hydrophone measurement locations as $$\frac{P(x_1,\omega)}{U} = A(\omega)e^{ik_b x_1} + B(\omega)e^{-ik_b x_1} + \tag{35}$$

$$C(\omega)e^{ik_e x_1} + D(\omega)e^{-ik_e x_1} = T_1,$$

$$\frac{P(x_2,\omega)}{U} = A(\omega)e^{ik_b x_2} + B(\omega)e^{-ik_b x_2} + \tag{36}$$

$$C(\omega)e^{ik_e x_2} + D(\omega)e^{-ik_e x_2} = T_2,$$

$$\frac{P(x_3,\omega)}{U} = A(\omega)e^{ik_b x_3} + B(\omega)e^{-ik_b x_3} + \tag{37}$$

$$C(\omega)e^{ik_e x_3} + D(\omega)e^{-ik_e x_3} = T_3,$$

and $$\frac{P(x_4,\omega)}{U} = A(\omega)e^{ik_b x_4} + B(\omega)e^{-ik_b x_4} + \tag{38}$$

$$C(\omega)e^{ik_e x_4} + D(\omega)e^{-ik_e x_4} = T_4,$$

where $T_1$, $T_2$, $T_3$, and $T_4$ are the transfer function data at a specific frequency. Unlike the estimation of the breathing wave speed, it is not necessary that the spatial distances $x_1$ through $x_4$ be equally spaced. Equations (35)–(38) are now written in matrix form as $$\begin{bmatrix} e^{ik_b x_1} & e^{-ik_b x_1} & e^{ik_e x_1} & e^{-ik_e x_1} \\ e^{ik_b x_2} & e^{-ik_b x_2} & e^{ik_e x_2} & e^{-ik_e x_2} \\ e^{ik_b x_3} & e^{-ik_b x_3} & e^{ik_e x_3} & e^{-ik_e x_3} \\ e^{ik_b x_4} & e^{-ik_b x_4} & e^{ik_e x_4} & e^{-ik_e x_4} \end{bmatrix} \begin{Bmatrix} A(\omega) \\ B(\omega) \\ C(\omega) \\ D(\omega) \end{Bmatrix} = \begin{Bmatrix} T_1 \\ T_2 \\ T_3 \\ T_4 \end{Bmatrix} \tag{39}$$

The coefficients are then solved for by multiplication of each side of equation (39) by a matrix inverse, which results in $$\begin{Bmatrix} A(\omega) \\ B(\omega) \\ C(\omega) \\ D(\omega) \end{Bmatrix} = \begin{bmatrix} e^{ik_b x_1} & e^{-ik_b x_1} & e^{ik_e x_1} & e^{-ik_e x_1} \\ e^{ik_b x_2} & e^{-ik_b x_2} & e^{ik_e x_2} & e^{-ik_e x_2} \\ e^{ik_b x_3} & e^{-ik_b x_3} & e^{ik_e x_3} & e^{-ik_e x_3} \\ e^{ik_b x_4} & e^{-ik_b x_4} & e^{ik_e x_4} & e^{-ik_e x_4} \end{bmatrix}^{-1} \begin{Bmatrix} T_1 \\ T_2 \\ T_3 \\ T_4 \end{Bmatrix}$$

In the second method, or the Gauss linearization scheme, the matrix iteration equation to estimate the wave propagation coefficients is $$b^{k+1} = b^{(k)} + [[X^{(k)}]^T[X(k)]]^{-1}[[X(k)]^T(y - h^{(k)})], \tag{41}$$

where the superscript k represents the kth iteration; the vector b is the wave propagation coefficient vector and is equal to $$b = \begin{Bmatrix} A(\omega) \\ B(\omega) \\ C(\omega) \\ D(\omega) \end{Bmatrix} \tag{42}$$

X is the following N by 4 sensitivity coefficient matrix $$X = \begin{bmatrix} e^{ik_b x_1} & e^{-ik_b x_1} & e^{ik_e x_1} & e^{-ik_e x_1} \\ e^{ik_b x_2} & e^{-ik_b x_2} & e^{ik_e x_2} & e^{-ik_e x_2} \\ \cdot & \cdot & \cdot & \cdot \\ \cdot & \cdot & \cdot & \cdot \\ \cdot & \cdot & \cdot & \cdot \\ e^{ik_b x_N} & e^{-ik_b x_N} & e^{ik_e x_N} & e^{-ik_e x_N} \end{bmatrix} \tag{43}$$

y is the N dimensional vector containing the measurement data as $$Y = \begin{Bmatrix} T_1 \\ T_2 \\ \cdot \\ \cdot \\ \cdot \\ T_N \end{Bmatrix} \tag{44}$$

and h is the N dimensional vector containing the model calculated using the current value of the estimated parameters and is equal to $$h = \begin{Bmatrix} A(\omega)e^{ik_b x_1} + B(\omega)e^{-ik_b x_1} + C(\omega)e^{ik_e x_1} + D(\omega)e^{-ik_e x_1} \\ A(\omega)e^{ik_b x_2} + B(\omega)e^{-ik_b x_2} + C(\omega)e^{ik_e x_2} + D(\omega)e^{-ik_e x_2} \\ \cdot \\ \cdot \\ A(\omega)e^{ik_b x_N} + B(\omega)e^{-ik_b x_N} + C(\omega)e^{ik_e x_N} + D(\omega)e^{-ik_e x_N} \end{Bmatrix} \tag{45}$$

Once the equations are assembled, the matrix b can be determined by iteration on the left-hand side of equation (41) at each specific frequency. It is well known that there are other, more computationally efficient, numerical methods for solving this equation. The matrix inverse and Gauss linearization methods are chosen because of the availability of stock algorithms.

Use of this model with this test method corresponds to a physical testing configuration in the Axial Vibration Test Facility (AVTF) at the Naval Undersea Warfare Center/Division Newport, as shown in FIG. 1. The facility is disclosed in U.S. patent application Ser. No. 08,821,552 filed on Mar. 21, 1997 allowed, which is incorporated by reference herein. The AVTF has been designed to provide a simple procedure for testing long structures under varying tensions and temperatures. The AVTF has a longitudinal shaker 12 at its forward end to provide axial excitation to the liquid-filled cylindrical shell 14. A rope 16 attached to the aft end of the shell 14 and a winch 18 allows the tension to be adjusted. A mass 20 is attached between the shell 14 and the rope 16 to increase the force levels and decrease the acceleration levels. This mass also produces an impedance change at the end of the bar that is sufficiently large to allow accurate modeling of the rope behavior by a spring and damper rather than by a continuous media expression. A rail 22 runs the entire length of the facility. Thin high strength, stretch resistant lines 24 can be hung from the rail 22 to provide lateral support to heavy or long test specimens. The unit is completely surrounded by an air-conditioned PVC duct (not shown) to permit temperature-dependent testing. To collect data during a test, impedance heads 26 and 28 are attached to the forward and aft ends of the structure. Each impedance head 26 and 28 consists of a single axial force transducer and an accelerometer. Additional data are collected by hydrophones 30 in the liquid-filled shell. Any number of hydrophones or pressure sensors 30 may be positioned within the liquid-filled shell. The hydrophones or pressure sensors 30 may include some whose characteristics are know and others to be tested. Further, the hydrophones may be equally or unequally spaced as described. A load cell 32 that measures the tension on the structure is located between the rope and the mass.

Equipment used in this laboratory configuration may include a Zonic Corporation model 1215-10-T-ZSP86 hydraulic shaker, two PCB Piezotronics model 348A accelerometers, two PCB Piezotronics model 233A force transducers, a Lebow model 31/3 load cell, and a Cordem Corporation model 1215-RMO tension drum.

In the first part of the method of the present invention, which measures the extensional wave speed, a longitudinally reinforced liquid-filled urethane shell 14 containing five equally spaced hydrophones 30 was placed in tension. The shell had a mean radius of 0.015 m and a thickness of 0.0028 m; the internal liquid had a density of 760 kg/m$^3$. The axial tension on the shell 14 was 890 N and the stressed length was 12.0 m. The point mass had a weight of 13.6 kg. The data from the force transducers, accelerometers, and hydrophones were acquired in the time domain with a Hewlett Packard (HP) 3562 dynamic signal analyzer (not shown). The analyzer then Fourier transformed the raw data to the frequency domain to obtain the desired transfer functions. The test was run with a frequency range between 3 and 100 Hz.

Equations (7)–(19) were applied to the test data taken with the force transducers and accelerometers, and the resulting extensional wave speed of the structure was found. The extensional wave speed versus frequency was calculated and then an ordinary least squares (OLS) straight-line was fit to this data. The OLS fit was applied to the data between 35 and 100 Hz to minimize the effect of the breathing wave interaction seen at lower frequencies. The resulting OLS fit was $c_e$=677.3+0.8 f (m/s) for the real part and $c_e$=83.3−0.05 f (m/s) for the imaginary part (where f is frequency in Hertz). These same values are used for the extensional wave speed in the following calculations in order to determine the breathing wave speed and estimate the wave propagation coefficients.

In the second part of the method, transfer functions of the hydrophone data divided by the forward accelerometer data were collected. Five hydrophones were placed in the shell and spaced at intervals of 1.83 m with a distance of 2.96 m from the forward end of the shell to the first hydrophone.

Equations (20)–(34) were applied to the test data, and the resulting breathing wave speed of the structure was $$Re(c_b) = \begin{cases} 4.8 + 4.7f, & f < 7 \text{ Hz} \\ 21.3 + 2.3f, & 7 \text{ Hz} \leq f < 12 \text{ Hz} \\ 35.2 + 1.1f, & 12 \text{ Hz} \leq f < 20 \text{ Hz} \\ 51.8 + 0.3f, & 20 \text{ Hz} \leq f \end{cases}$$

and $$Im(c_b) = \begin{cases} 4.9 + 0.7f, & f < 15 \text{ Hz} \\ 15.0, & 15 \text{ Hz} \leq f \end{cases}$$

where the breathing wave speed is in m/s. It is noted that the breathing wave for this specific structure is spatially coherent from 3 to 13 Hz. Above 13 Hz, the imaginary part of the measurement begins to diverge. Above 13 Hz, the breathing wave speed was extrapolated from the 3 to 13 Hz region. It is also possible that effects other than spatial incoherence are preventing the breathing wave from being identified at higher frequencies. Changing the extensional wave speed by ±20 percent and recalculating the breathing wave speed produced a change in the breathing wave speed of less than 1 percent. Thus, the breathing wave speed measurement method is very insensitive to incorrect extensional wave speeds. Additionally, the breathing wave speed was also insensitive to varying axial tensions.

Once the extensional and breathing wave speeds are measured, equations (35)–(45) can be applied to the hydrophone data. Twelve hydrophones were placed in the shell and were spaced at intervals of 0.5 m with a distance of 3.0 m from the forward end of the shell to the first hydrophone. Four hydrophone measurements are sufficient to define the empirical pressure field, however, the other eight hydrophones were included for verification purposes. Finally, the field at any location x can be determined by $$\frac{P(x,\omega)}{U} = A(\omega)e^{ik_b x} + B(\omega)e^{-ik_b x} + C(\omega)e^{ik_e x} + D(\omega)e^{-ik_e x} \quad (46)$$

Figure 2A:
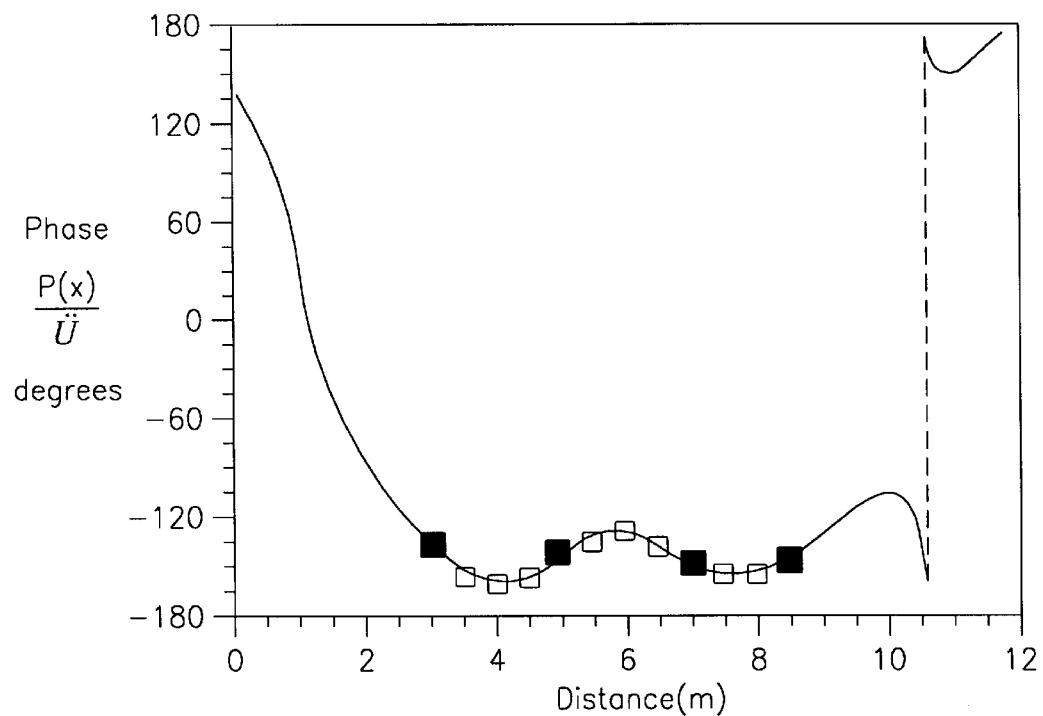
FIGS. 2(a) and 2(b) are graphs of the pressure field versus distance at 12.7 Hz with a model determined using the direct inverse method.
Figure 2B:
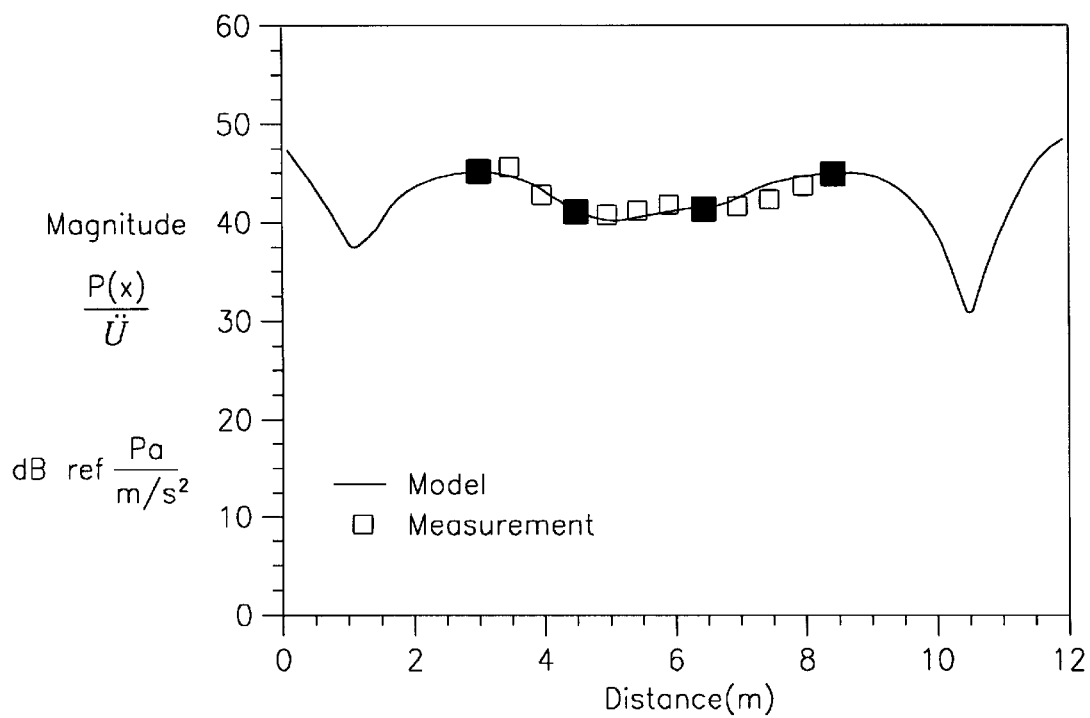
Figure 3A:
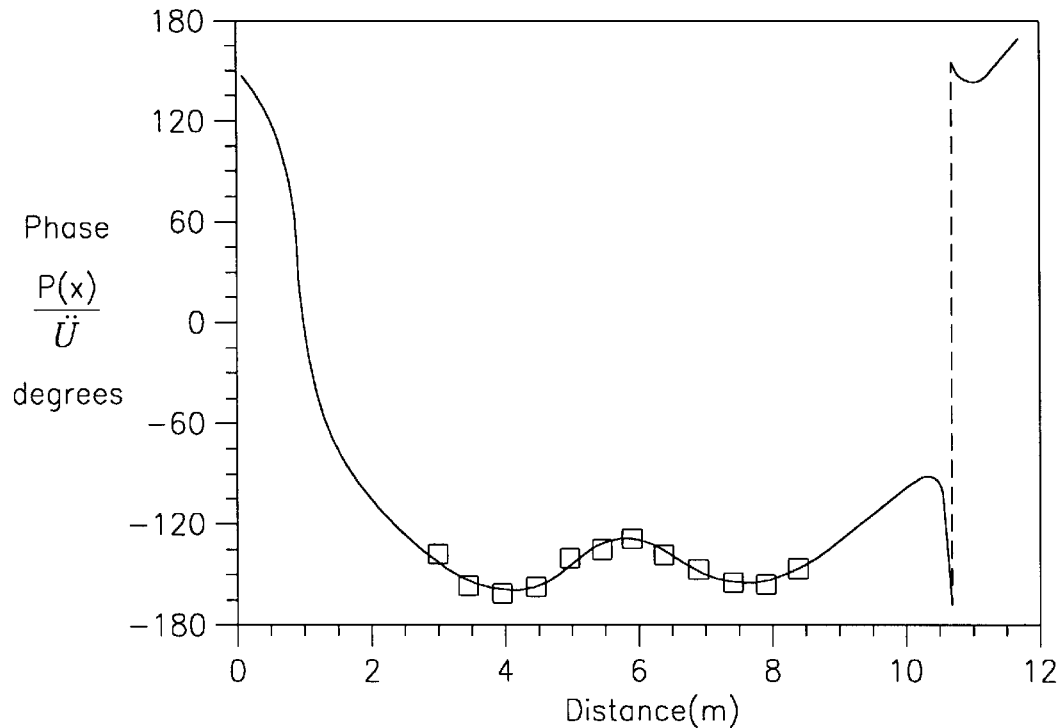
FIGS. 3(a) and 3(b) are graphs of the pressure field versus distance at 12.7 Hz with a model determined using the Gauss linearization method.
Figure 3B:
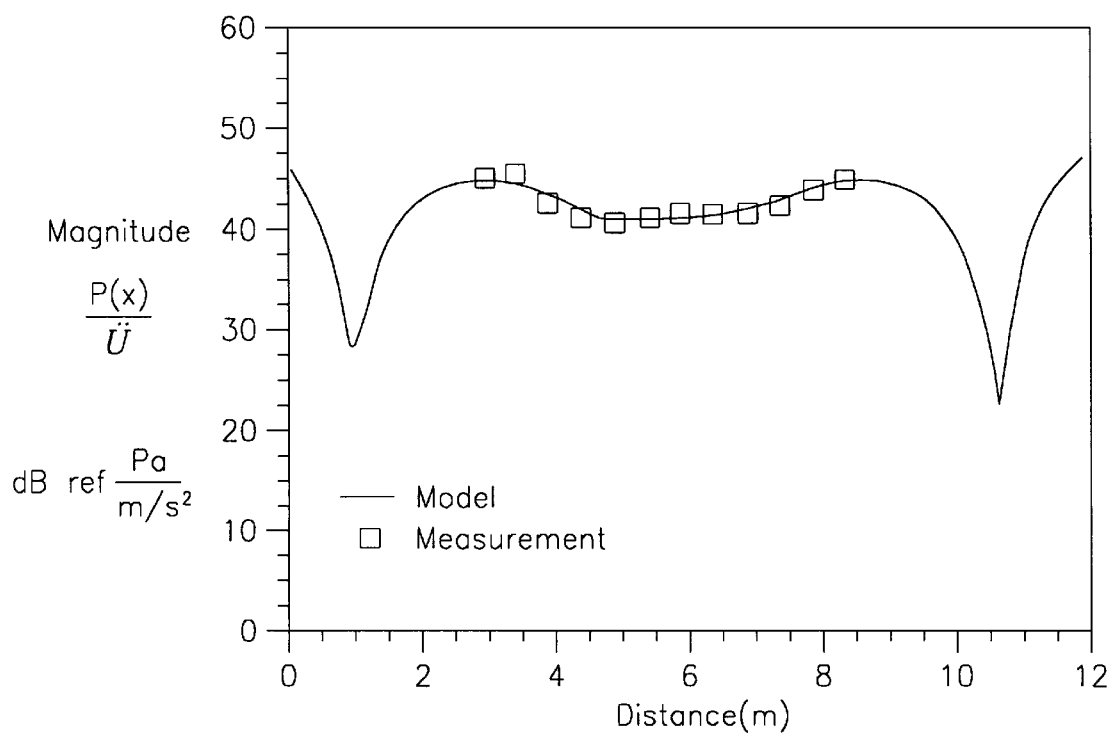

FIGS. 2(a) and 2(b) plot the data and the model of the pressure field versus distance at a frequency of 12.7 Hz. The model used in this example was based on equations (35)–(40). It is the direct inverse method. The black squares are the hydrophone measurements used to estimate the wave propagation coefficients, the clear squares are the independent measurements, and the line is the model defined by equation (46). Note that all of the hydrophones are in general agreement with the model. FIGS. 3(a) and 3(b) plot the data and the model of the pressure field versus distance at a frequency of 12.7 Hz. The model used in this example was based on equations (41)–(45). It is the Gauss linearization method. The clear squares are the measurements and the line is the model defined by equation (46). Note that all of the hydrophones are in general agreement with the model. Both the direct inverse method and the Gauss linearization method yield similar model results.

Once the pressure field from equation (46) has been calculated, the performance of hydrophones at any location in the shell can be predicted by comparing their output to the model. Favorable comparisons are when the model and data have approximately the same value as shown in FIGS. 2(a), 2(b), 3(a) and 3(b). Unfavorable comparisons are when the model and data disagree. Typically the hydrophones that are used to formulate the model are hydrophones whose dynamic response is understood and the comparison hydrophones are test hydrophones whose dynamic response is not well known.

The principal advantage of using the method of the present invention is that the measured laboratory response can be compared to a predicted response at a significant cost saving over at-sea testing. The towed array does not have to be taken to sea to determine the hydrophones responses to breathing and extensional wave induced pressure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the appended claims.

What is claimed is:

1. A method for determining whether a pressure sensor being tested is properly responding to a pressure field comprising the steps of:

providing a shell filled with a liquid and having impedance heads attached to a first end and a second end of said shell and a number of pressure sensors positioned between said first and second ends within said liquid filled shell;

developing a model of the pressure field within said liquid-filled shell by modeling an extensional wave contribution and by modeling a breathing wave contribution; and comparing the response of at least one of said pressure sensors to said pressure field described by said model.

2. The method of claim 1 further comprising determining the total pressure in said shell by summing the extensional wave contribution and the breathing wave contribution using the following $$P(x,\omega) = P_b(x,\omega) + P_e(x,\omega) = \overline{A}(\omega)e^{ik_bx} + \overline{B}(\omega)e^{-ik_bx} + \overline{C}(\omega)e^{ik_ex} + \overline{D}(\omega)e^{-ik_ex},$$

where $P(x,\alpha)$ is the temporal Fourier transform of the pressure that is generated by both the extensional and breathing waves; i is the square root of −1; and $\overline{A}(\omega)$, $\overline{B}(\omega)$, $\overline{C}(\omega)$, $\overline{D}(\omega)$, $k_b$ and $k_e$ are wave propagation coefficients determined by the boundary conditions.

3. The method of claim 2 further comprising:

dividing the pressure field at position x by the temporal Fourier transform of an acceleration at the forward end of the shell and arriving at the following equation:

$$\frac{P(x,\omega)}{U} = A(\omega)e^{ik_bx} + B(\omega)e^{-ik_bx} + C(\omega)e^{ik_ex} + D(\omega)e^{-ik_ex},$$

where $P(x,\omega)$ is the temporal Fourier transform of the pressure generated by both extensional and breathing waves; $U$ is the temporal Fourier transform of the acceleration at the forward end of the shell; and $A(\omega)$, $B(\omega)$, $C(\omega)$, and $D(\omega)$ are the wave propagation coefficients; and determining said wave propagation coefficients, a breathing wavenumber and an extensional wavenumber.

4. The method of claim 3 wherein said wave propagation coefficient determining step comprises estimating the extensional wavenumber and thereafter estimating the breathing wavenumber.

5. The method of claim 4 wherein said extensional wavenumber estimating step comprises:

determining the extensional wavenumber using data measurements in the form of transfer functions from forward and aft impedance heads attached to said ends of said shell for a number of frequencies; and determining a complex valued extensional wave speed at each frequency.

6. The method of claim 5 wherein said breathing wavenumber estimating step comprises determining a breathing wave speed for each said frequency using measurements of the spatial field by five independent equally spaced pressure sensors within said shell to eliminate the wave propagation coefficients.

7. The method of claim 6 further comprising the step of estimating said wave propagation coefficients using a direct inverse method.

8. The method of claim 7 wherein said estimating step comprises using four pressure sensor measurements to produce an exact solution for the coefficients.

9. The method of claim 6 further comprising the step of estimating said wave propagation coefficients using a number of hydrophone measurements and a Gauss linearization scheme with an ordinary least squares constraint to solve for said coefficients.

* * * * *